United States Patent [19]

Keshav et al.

[11] Patent Number: 5,623,605
[45] Date of Patent: Apr. 22, 1997

[54] METHODS AND SYSTEMS FOR INTERPROCESS COMMUNICATION AND INTER-NETWORK DATA TRANSFER

[75] Inventors: Srinivasan Keshav, Berkeley Heights, N.J.; Rosen Sharma, Stanford, Calif.

[73] Assignee: Lucent Technologies Inc., Murray Hill, N.J.

[21] Appl. No.: 297,209

[22] Filed: Aug. 29, 1994

[51] Int. Cl.$^6$ .............................. G06F 13/38; H04J 3/26
[52] U.S. Cl. ............................ 395/200.17; 395/200.15; 370/392; 370/397; 370/401
[58] Field of Search ........................... 395/200.02, 200.1, 395/200.15, 200.16, 200.17, 200.18, 831, 850, 874, 885; 370/85.13, 85.14

[56] References Cited

U.S. PATENT DOCUMENTS

| | | | |
|---|---|---|---|
| 5,329,527 | 7/1994 | Ujihashi et al. | 370/85.13 |
| 5,425,029 | 6/1995 | Hluchyj et al. | 370/85.13 |
| 5,440,551 | 8/1995 | Suzuki . | |
| 5,450,399 | 9/1995 | Sugita | 370/85.13 |
| 5,452,296 | 9/1995 | Shimizu . | |
| 5,526,351 | 6/1996 | Mochinaga et al. | 370/85.13 |
| 5,530,842 | 6/1996 | Abraham et al. | 395/200.1 |

OTHER PUBLICATIONS

"LightStream Traffic Management For Enterprise Backbone Networks" by LightStream Corporation, version 2 Mar. 1994.

Moldeklev et al.; "TCP/IP Behavior in a High–Speed Local ATM Network Environment"; Local Computer Networks 1994 19th Conference; pp. 176–185; IEEE 0–8186–6680–3/94 Mar. 1994.

Mah, B.A., "A Mechanism for the Administration of Real–Time Channels," Masters Thesis, University of California at Berkeley, pp. 1–21.

Leffler, S.J. et al.,, *The Design and Implementation of the 4.3BSD UNIX Operating System*, Addison–Wesley Publishing Company, pp. 311–327.

*ATM User–Network Interface Specification*, Version 3.0, PTR Prentice Hall, Englewood Cliffs, New Jersey, pp. 2–10, 150–167, 239–250.

Primary Examiner—Larry D. Donaghue
Assistant Examiner—Mark H. Rinehart
Attorney, Agent, or Firm—Robert E. Rudnick

[57] ABSTRACT

The methods and systems of the invention enable connectionless-oriented server and client programs operating on processing systems to communicate with connection-oriented routines operating on different processing systems linked to connectionless or connection-oriented networks by establishing connections or communications virtual circuits between such programs. The connectionless-oriented server and client programs may be modified to communicate with a connection manager to establish a virtual circuit before initiating communications with the connection-oriented routines. The invention further utilizes encapsulators and decapsulators to enable communication programs to transfer data packets in a first format on an established virtual circuit over a network transmitting data in a second format.

22 Claims, 6 Drawing Sheets

METHODS AND SYSTEMS FOR INTERPROCESS COMMUNICATION AND INTER-NETWORK DATA TRANSFER

FIELD OF THE INVENTION

The invention relates generally to processing system networks and more specifically to methods and systems for establishing communications between application programs on inter-network processing systems, and inter-network data transfer.

BACKGROUND OF THE INVENTION

Usage of asynchronous transfer mode ("ATM") networks for the transfer of multimedia information including video, voice and data has become increasingly popular due to the high data rate and flexibility of such networks. ATM networks use a packet switching technique standard specified by the CCITT, as described in M. dePrycker, Asynchronous Transfer Mode: Solutions from Broadband ISDN (Ellis Horwood, 1993). ATM networks have been embraced by the computer and telecommunication industries for networking existing and future multimedia applications, such as video conferencing, video-on-demand, and telephone applications. An ATM network is a connection-oriented network in which each transfer of data between network devices is preceded by a call to a network connection manager to establish a virtual circuit or connection between the devices. A virtual circuit corresponds to a particular routing path identified by the network connection manager for transmitting data between the devices. However, few commercially available computers are ATM compatible. Furthermore, presently available connections to the small number of existing ATM networks is limited due to the high cost of data routing switches currently used in the construction of ATM networks.

In contrast, computers or other processing systems which communicate with each other over a connectionless network, such as the Internet, are currently being used worldwide, and can be found in business offices, schools and in many homes. These networks are referred to as being connectionless because data is transferred over the network from a source device to a destination device without first establishing a "connection" or virtual circuit as is required in ATM networks.

Computers communicate over a connectionless network using any one of a number of protocols, such as the Internet Protocol ("IP"). Protocols provide for file transfer, remote log-in, electronic mail and other services, including distributed processing. The IP, among its other facilities, enables a data packet to traverse one or multiple networks from a source device to a final destination device. In a connectionless network, data is transmitted by a source device with an address of the destination device and the connectionless network will route that data by any number of network paths to the desired destination device.

The differences in these data transfer-techniques has been a major obstacle in linking the large numbers of computers and applications software available on connectionless networks, such as the Internet, with the devices and wide range of services expected to become available on ATM network. Differences in data packet formats used for transferring information on the respective networks has further hindered such linking of network systems.

Thus, a recognized need exists to establish communications and data transfer between connectionless and ATM networks.

SUMMARY OF THE INVENTION

Many of the problems of the prior art interprocess communication and inter-network data transfer are overcome in accordance with the principles of the present invention.

Existing connectionless server and client programs may be modified to communicate with connection-oriented routines operating on different devices connected to connectionless or connection-oriented networks by establishing connections or virtual circuits between such programs. A server program provides services for other programs and routines, and a client program utilizes the services provided by a server program.

Such connectionless server and client programs communicate with a connection manager before transferring data. The connection manager is a routine or circuit which establishes and maintains connections between programs. A server program may be modified to establish communications with remote client routines by sending an available service message to the connection manager. The connection manager then registers the available service based on the available service message and transmits back an acknowledgment of registration message to the server program. A client program may then send a connection request message to the connection manager to request a connection to the particular available service performed by the server program. Upon receipt of such a message, the connection manager sends a corresponding connection request to the server program. The server program may then send an accept connection message to the connection manager which in response sends back a virtual circuit identifier ("VCI") value corresponding to the established connection between the server program and remote client routine. The VCI value is then used by the network interface of the device upon which the server program is operating to pass data packets received from the network possessing that VCI value.

In a corresponding manner, a client program may be modified to establish communications with remote server routines by sending a message to the connection manager requesting connection to a particular server routine. The connection manager then acknowledges the request by sending a return acknowledgment message. The connection manager determines if the requested service is performed by an available server routine, and if so, establishes a connection with that server routine. Upon establishing a connection with the server routine, the connection manager sends a connection established notification to the client program. The connection established notification contains the VCI value of the corresponding established connection. The VCI value is then used by the network interface of the device upon which the client program is operating to pass the data packets received from the network possessing that VCI value.

One aspect of the present invention relates to the transmission of data packets once a connection has been established. The invention permits the transfer of information between a source routine operating in a source device and a destination routine operating in a destination device, wherein the source and destination routines generate and receive data in ATM-formatted frames and the network transmits data in Internet protocol ("IP") packets. Such data transfer is accomplished using encapsulators and decapsulators to encapsulate ATM-formatted frames in data portions of IP packets for transmitting on the network.

According to one encapsulation method according to the present invention, an intermediate data format header is created containing source and destination information for an ATM-formatted frame that is to be transmitted. The generated intermediate format header is then appended to the ATM-formatted frame to form an intermediate format data packet. The intermediate format data packet is then encapsulated into a data portion of an IP packet and transmitted over the network. The encapsulated IP packet received by the destination device may then be decapsulated into the original ATM-formatted packet.

One decapsulation method according to the present invention first retrieves the intermediate format data packet from the received IP packet. The ATM-formatted frame and the intermediate data format header are then retrieved from the intermediate format data packet. The destination device may then route the retrieved ATM-formatted frame to the corresponding destination routine, or if the destination device is an intermediate gateway destination device, the data packet of the first format may be transmitted on a second network to a final destination device.

The present invention facilitates the data transfer between communicating routines on one or more linked networks, wherein the data format of the information that is transmitted and read by the routines is different than that which the network or networks is capable of transmitting.

The above-discussed features, as well as additional features and advantages of the present invention, will become more readily apparent by reference to the following detailed description and the accompanying drawings.

DETAILED DESCRIPTION

Figure 1:
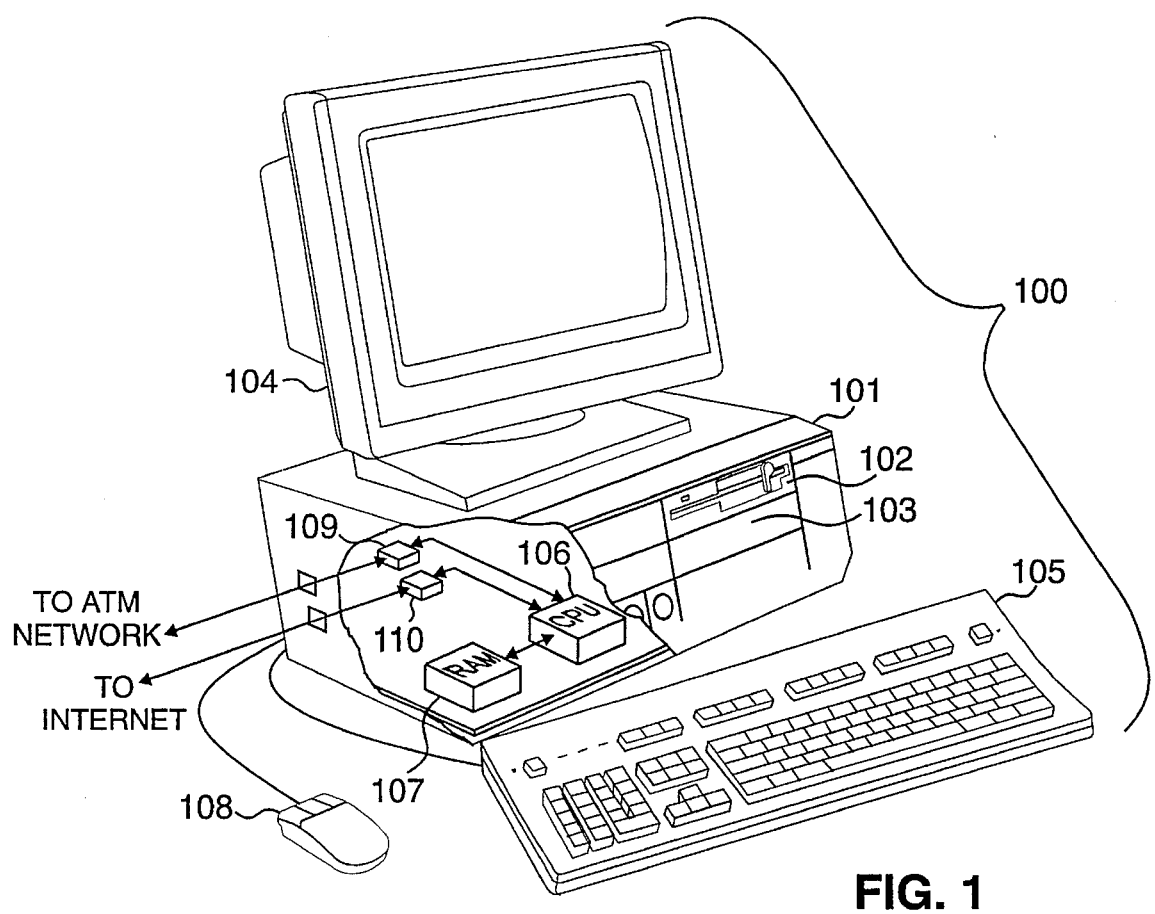
FIG. 1 illustrates an isometric view of a personal computer which may function in accordance with the present invention.
Figure 3:
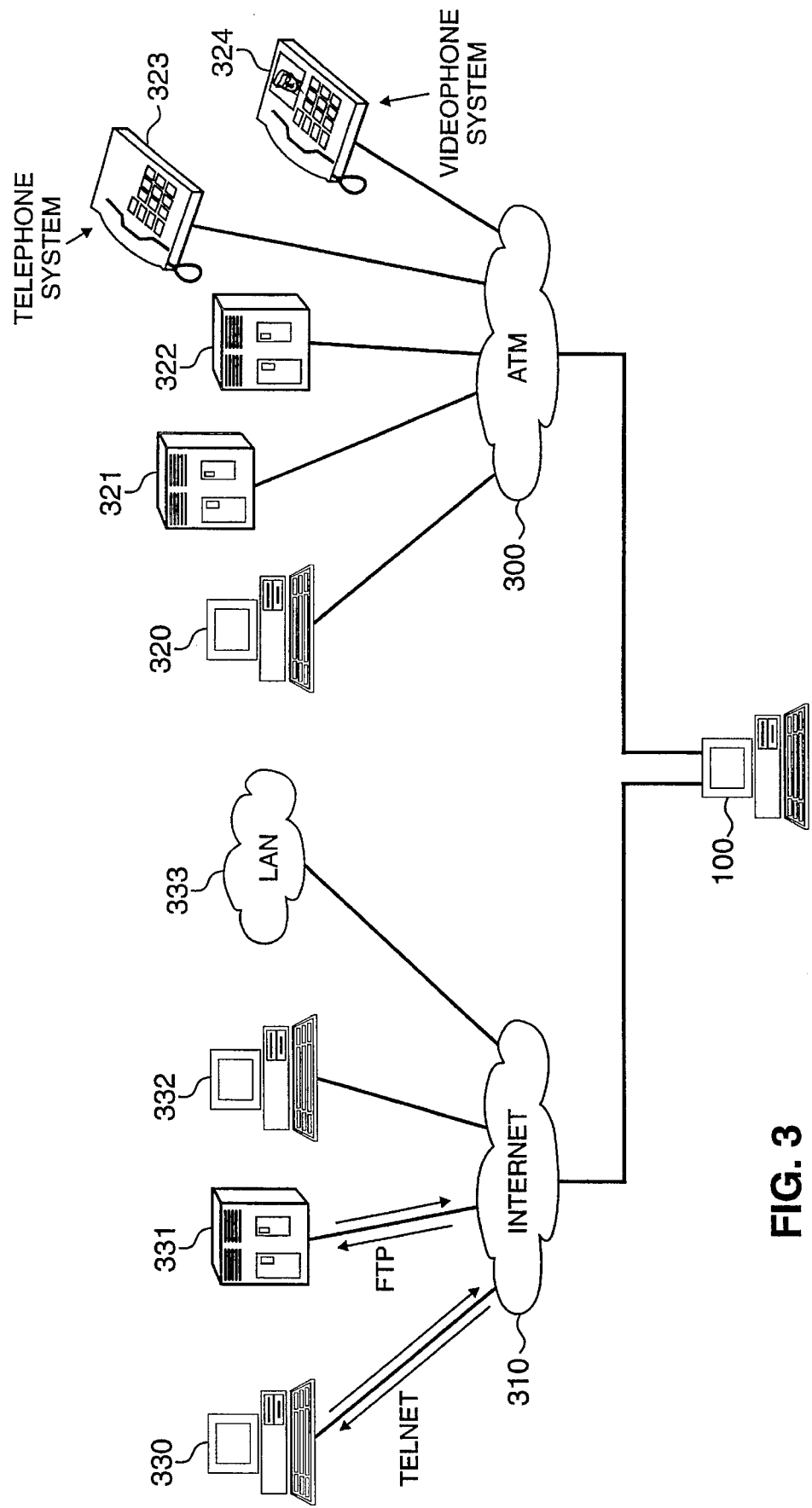
FIG. 3 illustrates a block diagram of a connectionless network and an asynchronous transfer mode ("ATM") network to which the personal computer of FIG. 1 is attached.
Figure 4:
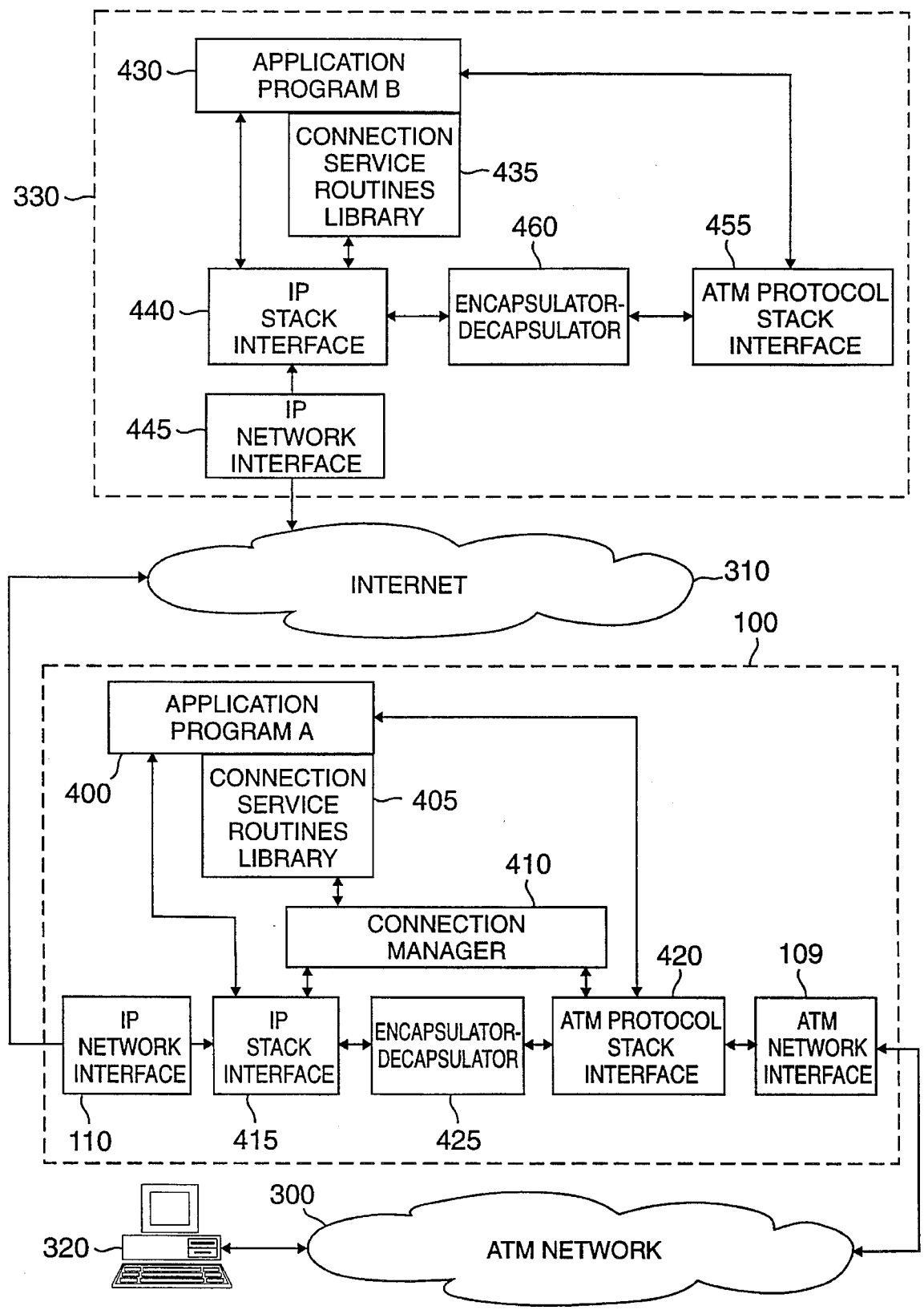
FIG. 4 illustrates a block diagram of communicating routines and exemplary applications programs executed in processing systems linked to the networks of FIG. 3, which may be used to communicate and transfer data between the networks.

FIG. 1 illustrates an isometric view of a personal computer ("PC") 100 which may function as an asynchronous transfer mode ("ATM") enabled host within a processing system network illustrated in FIGS. 3 and 4. The PC 100 is comprised of a hardware casing 101 (illustrated as having a cut-away view), a monitor 104, a keyboard 105 and optionally a mouse 108. Note that the monitor 104, and the keyboard 105 and mouse 108 may be replaced by any suitably arranged output and input devices, respectively. The hardware casing 101 includes both a floppy disk drive 102 and a hard disk drive 103. The floppy disk drive 102 is operable to receive, read and write to external disks, while the hard disk drive 103 is operable to provide fast access data storage and retrieval. The PC 100 may also be equipped with any suitably arranged structure for receiving and transmitting data, including, for example, tape and compact disc drives, and serial and parallel data ports.

Within the cut away portion of the hardware casing 101 is a processing unit, such as a central processing unit ("CPU") 106, coupled with a memory storage device, which in the illustrated embodiment is a random access memory ("RAM") 107. The CPU 106 is further connected to an ATM network interface 109 as well as a connectionless network interface, such as an Internet interface 110. A suitable ATM network interface 109 is an ATM host adaptor card commercially available from Fore Systems, Inc. of Pittsburgh, Pa. Suitable connectionless network interfaces 110 include those commercially available for connection to the Internet.

Although the PC 100 is shown having a single CPU 106, PC 100 may be equipped with a plurality of CPUs 106 operable to cooperatively carry out the principles of the present invention. Also, although the PC 100 is shown having a single local memory storage device 107, the PC 100 may be equipped with a plurality of local memory storage devices. Further, although the PC 100 is being utilized for illustrating one implementation of an ATM enabled host within a processing system network, the invention may alternately be implemented within any processing system having at least one processing unit, including, for example, sophisticated calculators and handheld, mini, main frame and super computers, including RISC and parallel processing architectures, as well as within processing system network combinations of the foregoing.

Figure 2:
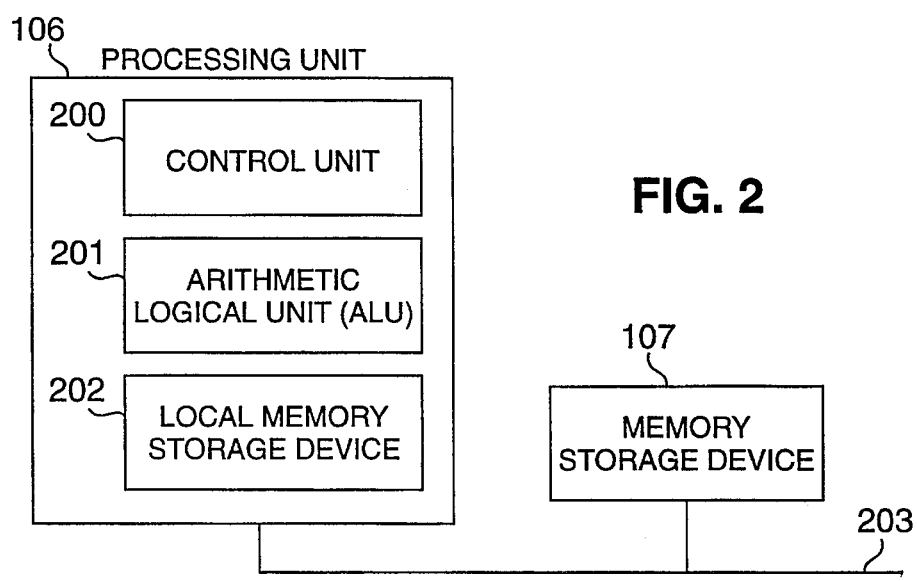
FIG. 2 illustrates a block diagram of a microprocessing system, which may be utilized in conjunction with the personal computer in FIG. 1.

FIG. 2 illustrates a block diagram of a microprocessing system, which may be utilized in conjunction with the personal computer 100 in FIG. 1. The microprocessing system includes a single processing unit, such as the CPU 106, coupled via data bus 203 with a memory storage device, such as the RAM 107. The memory storage device 107 is operable to store one or more instructions which the processing unit 106 is operable to retrieve, interpret and execute.

The processing unit 106 includes control unit 200, an arithmetic logic unit ("ALU") 201, and a local memory storage device 202, such as, for example, stackable cache or a plurality of registers. The control unit 200 is operable to retrieve instructions from the memory storage device 107. The ALU 201 is operable to perform a plurality of operations, including addition and Boolean AND needed to carry out instructions. The local memory storage device 202 is operable to provide high speed storage used for storing temporary results and control information.

A contemplated use of the interprocess communication and inter-network data transfer methods and systems of the present invention is to provide communication and data transfer between devices on the Internet and the ATM network. Thus, the invention is described below with reference to these connectionless and connection-oriented networks, respectively, which is not meant to be a limitation on the types of networks which may suitably utilize the present invention.

FIG. 3 illustrates a block diagram of an ATM enabled host, such as the processing system 100 of FIG. 1 linked to an ATM network 300 and a connectionless network, such as the Internet 310. The processing system 100 may operate as a gateway to enable data transfer between the networks 300 and 310. The ATM network 300 links the processing system 100 with processing systems 320 and 321, a video on demand service device 322, a telephone system 323 and a video phone system 324. The ATM network is a cell switching network that is capable of transmitting voice, data or video information between devices connected to the ATM network 300 by organizing such information into small cells or packets. The CCITT and ATM Forum have standardized many aspects and features of ATM networks as provided in ATM Forum User-Network Interface 3.0 (Prentice-Hall, 1993) ("ATM Forum UNI reference"), which is hereby incorporated by reference in its entirety. The ATM cells are transmitted through the ATM network 300 at high speeds, presently ranging from 50 megabits per second to 2.4 gigabits per second.

The Internet 310 links the processing system 100 with processing systems 330, 331 and 332 and a local area network ("LAN") 333. The LAN 333 is a communications network connecting various hardware devices together within a building or complex by means of a continuous cable or in-house voice data telephone system. The Internet is generally defined as any collection of independent or distinct connectionless networks operating together as one, and may include a worldwide network of networks that are connected to each other using any one of a number of protocols, such as an Internet Protocol ("IP"). Protocols provide file transfer, remote log-in, electronic mail and other services, including distributed processing, as well as other resources. The IP, among its other facilities, enables an IP data packet from a source node, such as the processing system 100, to traverse multiple networks on its way to a final destination node without first establishing a virtual circuit or "connection".

Without modification, existing applications programs implemented on a connectionless network, such as the Internet 310, cannot utilize services available on an ATM network, such as the network 300, due to the ATM network requirement of establishing virtual circuits and the data packet format mismatches.

FIG. 4 illustrates a block diagram arrangement of communicating processes and routines according to one embodiment of the present invention that enables exemplary application programs A 400 and B 430 to communicate with devices on the ATM network 300. In the following description, a routine which performs a service when requested by another routine is called a server routine. Further, the routine requesting the service is referred to as a client routine.

In FIG. 4, routines performed by the processing systems 100 and 330 of FIG. 3 are contained within the corresponding broken outlines designated 100 and 330, respectively. Within the processing system 100, the exemplary application program A 400, which may be a connectionless server or client program, communicates with a connection service routines library 405. Communications may occur by interprocess communication within the processing unit 106, shown in FIG. 2, or by a connection between two suitably programmed circuits or devices within the processing system 100.

The connection service routines library 405 communicates with a connection manager 410. The connection manager 410 further communicates with an Internet protocol ("IP") stack interface 415 and an ATM protocol stack interface 420. The stack interfaces 415 and 420 also communicate with an encapsulator-decapsulator 425 and the application program A 400. The connection manager 410 may be a program or routine operating on the processing unit 106, shown in FIG. 1, or a suitably programmed device or circuit contained within the processing system 100. A suitable connection manager 410 routine is described in the ATM Forum UNI reference at §5, pp. 149–292, which is incorporated by reference.

The IP stack interface routine 415 communicates with the network interface 110 and causes it to generate the necessary signals to enable data transfer between the processing system 100 and the Internet 310. The IP stack interface 415 is an implementation of the semantics of the IP. In other words, the IP stack interface 415 operates to provide perform the abstract functionality needed by each layer specified for the Internet protocol, including signalling. The IP stack interface 415 may be a routine operating in the processing unit 106 or a suitably programmed circuit or card contained within the processing system 100. A suitable IP stack interface 415 is described in S. J. Leffler, M. K. McKusick, M. J. Karels and J. S. Quarterman, The Design and Implementation of the 4.3 BSD UNIX Operating System, (Addison-Wesley, 1989) ("BSD reference"), which is incorporated by reference herein in its entirety. The IP stack interface 430 communicates with the application program A 400 to enable data transfer in a conventional manner with other devices on the Internet 310.

Likewise, the ATM protocol stack interface 420 communicates with the ATM network interface 109 and causes it to generate the proper signals that enable data transfer between the processing system 100 and a device on ATM network 300, such as the processing system 320. The ATM protocol stack interface 420 implements the semantics or abstract functionality of a native-mode ATM stack. A suitable ATM protocol stack interface 420 is described in the BSD reference.

The encapsulator-decapsulator 425 performs the encapsulation and decapsulation of an ATM-formatted frame within an IP data packet for transmission and reception of the ATM-formatted frames over the Internet 310. Methods which may be used in the encapsulator-decapsulator 425 to perform encapsulation and decapsulation of the ATM-formatted frames are described in detail below with regard to FIGS. 7 and 8, respectively.

As a consequence, the ATM protocol stack interface 420 may perform data transfer of ATM-formatted frames between the application program A 400 and a device on the ATM network 300 via the ATM network interface 109, or a device on the Internet 310 via the encapsulator-decapsulator 425 and IP protocol stack interface 415. In addition, the stack interfaces 415 and 420 and the encapsulator-decapsulator 425 may operate as a gateway processing system or ATM-enabled host on the Internet 310 for transferring data between devices on the networks 300 and 310.

In a similar manner, within the processing system 330, the application program B 430, which may also be a connectionless server or client routine, communicates with a corresponding connection service routines library 435, an IP stack interface 440 and an ATM protocol stack interface 455. The connection service routines library 435 further communicates with the IP protocol stack interface 440. The IP stack interface 440 also transmits and receives IP packets from an Internet network interface 445 connected to the Internet 310.

The IP stack interface 440 and the internet network interface 445 may operate in a substantially identical manner to the IP stack interface 415 and network interface 110, respectively, in the processing system 100. Likewise, the ATM protocol stack interface 455 and the encapsulator-decapsulator 460 operate in a substantially identical manner as their counterparts within the processing system 100. However, the ATM protocol stack interface 455 only transmits and receives ATM-formatted frames between the application program B 430 and the encapsulator-decapsulator 360, and not with any ATM networks.

Application programs A 400 and B 430, shown in FIG. 4, may be existing application routines which have been modified to transfer ATM-formatted frames and to incorporate connection service routines library calls for establishing communications connections with remote client or server programs. The remote programs may operate on devices linked to the ATM network 300, such as the processing system 320 of FIGS. 3 and 4. The connections or virtual circuits that enable communication between routines are established and maintained by the connection manager 410. Accordingly, the connection service routines library 405 maintained within the processing system 100 may communicate directly with the connection manager 410. In a similar fashion, the connection service routine library 435 may communicate with the connection manager 410, in a conventional manner, over the Internet 310 via the IP stack interfaces 415 and 440.

The connection service routines library 435 contains suitable routines to communicate with the connection manager 410 for the establishment and maintenance of virtual circuits or connections. The operations of several routines which may be contained in the connection routines library are described in greater detail below with regard to FIGS. 5 and 6. Alternatively, the application programs A 400 and B 430 may be connection-oriented programs such as those created for operation with the ATM network 300. In such an instance, no modification of the programs A 400 and B 430 would be required to use the respective connection service routines library 405 and 435 for establishing connections.

After a connection has been established between two routines, such as the application program B 430 and a remote routine on the processing system 330, data may be transferred between the routines in the following manner. Referring to FIG. 4, assuming the connected routines are able to transmit and receive data using an ATM protocol, the program 430 sends the data to the ATM protocol stack interface 455 in the processing system 330. The ATM protocol stack interface 455 arranges the data into an ATM-formatted frame and transmits it to the encapsulator-decapsulator 460 which encapsulates the data packet within an IP packet. One suitable encapsulation routine is described below with reference to FIG. 7.

The encapsulated IP packet is then sent to the IP stack interface 440 which transmits it over the Internet 310 to the processing system 100 via the IP network interface 445. Within the processing system 100, the IP stack interface 415 receives the IP packet from the IP network interface 110. The IP stack interface 415 identifies the IP packet as an encapsulated IP packet and sends it to the encapsulator-decapsulator 425 for decapsulation. One suitable decapsulation routine is described below with reference to FIG. 8.

The decapsulated ATM-formatted frame is then sent by the encapsulator-decapsulator 425 to the ATM protocol stack interface 420 which identifies the destination of the ATM-formatted frame based on information from the control manager 410. The ATM protocol stack interface 420 then controls the ATM network interface 109 to transmit the ATM-formatted frame to the processing system 320 over the ATM network 300.

Figure 5:
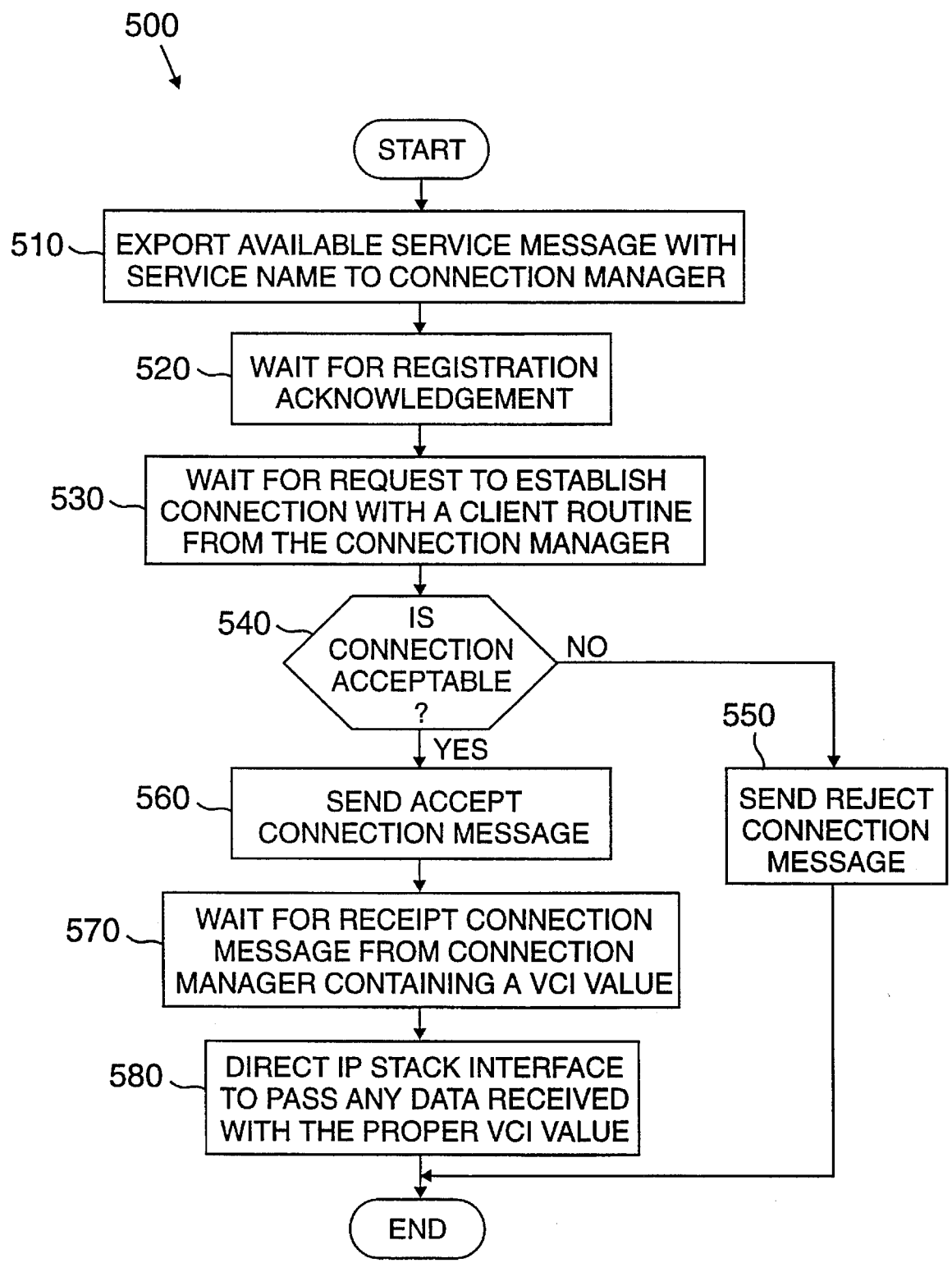
FIG. 5 illustrates a flow diagram of a server connection routine which may be used in the processing systems of FIG. 4.

FIG. 5 illustrates a flow diagram of a server connection routine 500 which may be used to establish a connection for transferring data to and from a remote connection-oriented routine. The remote connection-oriented routine may be operating on a device linked to the ATM network 300 or the Internet 310. The server connection routine 500 will be described with respect to the application program B 430, implemented on the processing system 330 of FIG. 4, as the server program. However, the method may be used by any connectionless server routine operating on a device connected to the Internet 310, such as the application program A 400 operating on the processing system 100.

Referring to FIG. 5, in step 510, when the server application program B 430 wishes to advertise its service, it directs a service routine in the connection service routines library 435 to export an available server program message to the connection manager 410. The server program message contains the service name of the available service. The message may be transmitted to the connection manager 410 in a conventional manner over the Internet 310 via the IP stack interfaces 440 and 415, and their corresponding network interfaces 445 and 110. The exported message may also contain a network port number on which the server application program B 430 will be listening for messages from the connection manager 410. Upon receipt of an available service message from the server application program, the connection manager 410 registers the available service name and its port number in an available services list. The connection manager 410 then sends back a message acknowledging such registration.

After exporting the available service message in step 510, the server application program B 430 waits, in step 520, for the connection manager 410 to send the acknowledge registration message to the designated network port number. After receiving the acknowledge registration message in step 520, the server application program B 430 again waits, in step 530, for an incoming connection message transmitted by the connection manager 410. Such a message indicates that a remote client program has requested a connection to the server application program B 430 from the connection manager 410. A remote client program operating, for example, on the processing system 320 linked to the ATM network 300, may generate such a service connection request. Upon receipt of a request from a remote client program for the available service provided by the server application program B 430, the connection manager 410 would transmit the incoming connection message to the server application program B 430.

In order to provide a measure of security, the incoming connection message transmitted to the server application program B 430 may contain a connection key. The connection key may be a 16 bit information word that gives the holding IP stack interface, such as the IP stack interface 440 in this example, the information necessary to establish a connection in a manner described below.

After receiving the incoming connection message in step 530, the server application program B 430 determines, in step 540, whether it will accept the connection. If the program 430 determines not to accept the connection in step 540, then in step 550, a reject connection message is transmitted to the connection manager 410 and the server connection routine ends. The receipt of the reject connection message by the connection manager 410 may cause it to remove the corresponding available service name from the available services list. In the alternative, upon sending the reject connection message in step 550, the server connection routine 500 may return to step 530, where it waits for another connection request from the connection manager 410. In such an alternative configuration, the connection manager 410 would not remove the corresponding service name from the available services list upon receipt of the reject connection message.

However, if in step 540, the server connection routine 500 determines that the connection is acceptable, then the routine 500 proceeds to step 560. In step 560, the server application program B 430 causes the connection service routines library 435 to transmit an accept connection message to the connection manager 410. The accept connection message may contain the connection key, previously transmitted by the connection manager 410, to ensure that a connection will be established between the proper client and server programs.

Then, in step 570, the server application program B 430 waits for receipt of the virtual circuit identifier ("VCI") value transmitted by the connection manager 410 corresponding to the established connection. The VCI value is a unique identifier used in ATM networks that corresponds to the virtual circuit or data path that the data will traverse between the server and remote client programs on the respective processing systems 330 and 320. The VCI value identifies the connection between the server and remote client programs as maintained by the connection manager 410, and ensures that the connection manager 410 will route data transmitted with that VCI value to the proper processing system. A more detailed description of VCIs is provided in the ATM forum UNI reference cited above.

Upon receipt of the VCI value in step 570, the server application program B 430 sends the VCI value to the ATM protocol stack interface 445 in step 580. The ATM protocol stack interface 445 uses the VCI value to pass any received ATM-formatted frame with that particular VCI value received from the Internet 310 to the server application program B 430. The functions of step 580 may alternatively be referred to as a binding of the VCI value to the corresponding ATM protocol stack interface 440 and server application program 430. The connection manager 410 of the processing system 100 maintains a VCI mapping list that contains the VCI values of the established connections and the Internet network port numbers of the corresponding processing systems executing the connected programs. Data generated by the connected server and remote client programs is then routed to their respective destination over the networks 300 and 310 through the processing system 100 as controlled by information from the connection manager 410.

The connection manager 410 may perform its operation by continuously examining and updating five lists. These five lists include the available service list and the VCI mapping list described above, a client request list for client programs waiting for an available server program, a connection request list for storing identities of connections awaiting acceptance, and a binding connection list. The binding connection list contains those connections which have been established by the connection manager 410 but have not yet been bound to the corresponding ATM protocol stack interfaces.

Any existing connectionless server application programs may be easily modified to establish connections by incorporating the connection service routines library calls described with regard to the server connection routine 500 of FIG. 5. For example, the server application program may be modified to include the following connection service routines library calls:

(1) export_service(service Name, TCP_PORT);
(2) conkey=await_service_request();
(3) VCI=accept_connection(conkey);
(4) bind(VCI);

The library call export_service corresponds to step 510 of the routine 500 and transmits a service name serviceName and a local network port number TCP_PORT. The local network port number corresponds to the network port which the server program will be listening for a response from the connection manager 410. The library call await_service_request corresponds to step 530 and passes back the optional connection key conkey. The library call accept_connection corresponds to steps 560 and 570 and transmits the optional connection key to provide a measure of security that the connection manager 410 is making connection with the proper server program. The library call accept_connection passes back the received VCI value. The library call bind corresponds to step 580 for binding the corresponding protocol stack interface to pass any data with the proper VCI value transmitted on the Internet 310 to the server application program.

Figure 6:
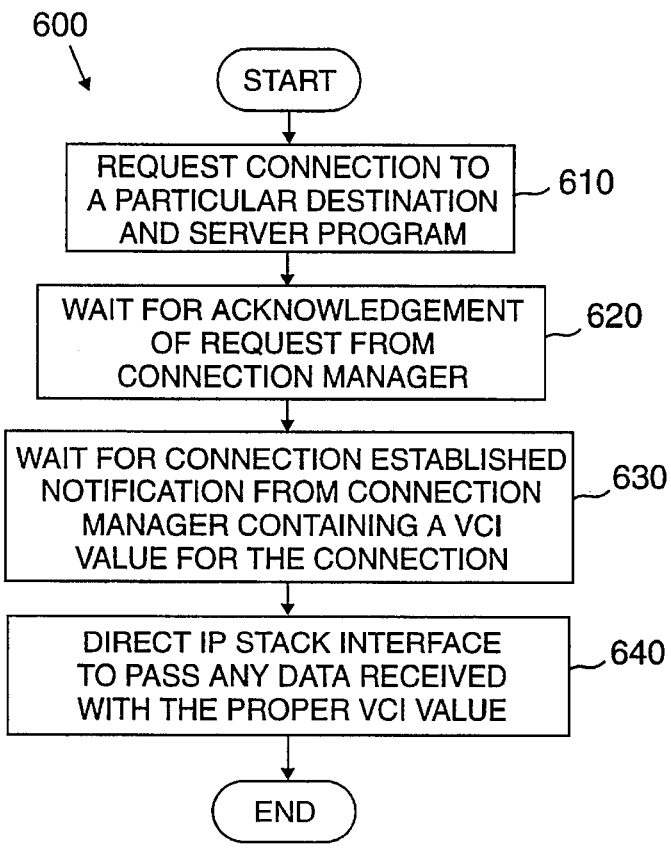
FIG. 6 illustrates a flow diagram of a client connection routine which may be used in the processing systems of FIG. 4.

FIG. 6 illustrates a client connection routine 600 which may be used by a processing system to obtain a virtual circuit with a desired remote connection-oriented server program. By way of example, the client connection routine 600 will be described with respect to the application program A 400 operating on the processing system 100 of FIG. 4 as a client program. The corresponding remote server program may be located on a device linked to the ATM network 300 or the Internet 310.

Referring to FIG. 6, in step 610, the client application program A 400 causes the connection service routines library 405 to transmit a request message to the connection manager program 410. The request message may contain information such as a particular desired server name, and the local network port address where the client program will be listening for a response. The client application program 400 then waits, in step 620, for acknowledgment of the request transmitted by the connection manager 410 to the specified local network port address. The subsequent acknowledgment sent by the connection manager 410 may contain a corresponding connection key which may be used in a similar manner as that described above with respect to the server connection routine 500 of FIG. 5.

After receiving the acknowledgment from the connection manager 410 in step 620, the routine 600 then waits, in step 630, for a subsequent message from the connection manager 410 that a connection with the requested remote server program has been established. The connection manager 410 may establish a connection with the remote server program in the manner described above with regard to routine 500 of FIG. 5. The received message indicating that connection has been established may contain the corresponding VCI value for the connection. The VCI value is used by the client application program A 400 in a substantially identical manner as that also described above with respect to the routine 500 of FIG. 5.

Upon receipt of the message indicating that a connection has been established in step 630, the routine proceeds to step 640. In step 640, the client connection routine sends the VCI value to the ATM protocol stack interface 420 for binding the VCI value to the client application program A 400. The binding step 640 causes the ATM protocol stack interfaces 420 to pass any data packet with the proper VCI value to the client application program A 400. Note that the ATM protocol stack interface 420 is operable to receive and send ATM-formatted frames over the ATM network 300 via the ATM network interface 109, and over the Internet 310 via the encapsulator-decapsulator 425 and the IP stack interface 415. Thus, client and server programs communicating using ATM-formatted frames may operate on two devices connected to the Internet 310 and which possess ATM protocol stack interfaces and encapsulator-decapsulators. Such routines would operate normally without being aware that an ATM network is not present.

Existing connectionless client application programs may be modified to communicate with connection-oriented server programs by incorporating the following two exemplary library calls which may be included in the connection service routines library:

(1) VCI=open_connect (ServerName, TCP_PORT);
(2) connect(VCI).

The library call open_connect transmits a desired server name ServerName and the local network port address TCP_PORT where client program will be listening for a response from the connection manager 410. Upon finding an available server program, the connection manager 410 would transmit back a VCI value for the corresponding connection. The library call open_connect operates to pass back the received VCI value to the client application program A 400. Correspondingly, the library call open_connect performs steps 610, 620 and 630, of the client connection routine 600 in FIG. 6. The library call connect(VCI) passes the VCI value to the corresponding ATM protocol stack interface in order to direct it to pass any reserved data packets that possess the proper VCI value on the network. The service routine connect(VCI) corresponds to step 640 in FIG. 6.

The server and client connection routines 500 and 600 of FIGS. 5 and 6, respectively, enable existing client and server programs employing connectionless network techniques to provide or request services from connection-oriented networks, such as the ATM network 300. The added flexibility is achieved by the present invention with minimal modification to the connectionless client or server program. Thus, according to one aspect of the present invention, a large number of programs available on the Internet may be easily modified to take advantage of the variety of services offered on an ATM network or which have been written for use with connection-oriented networks.

Figure 7:
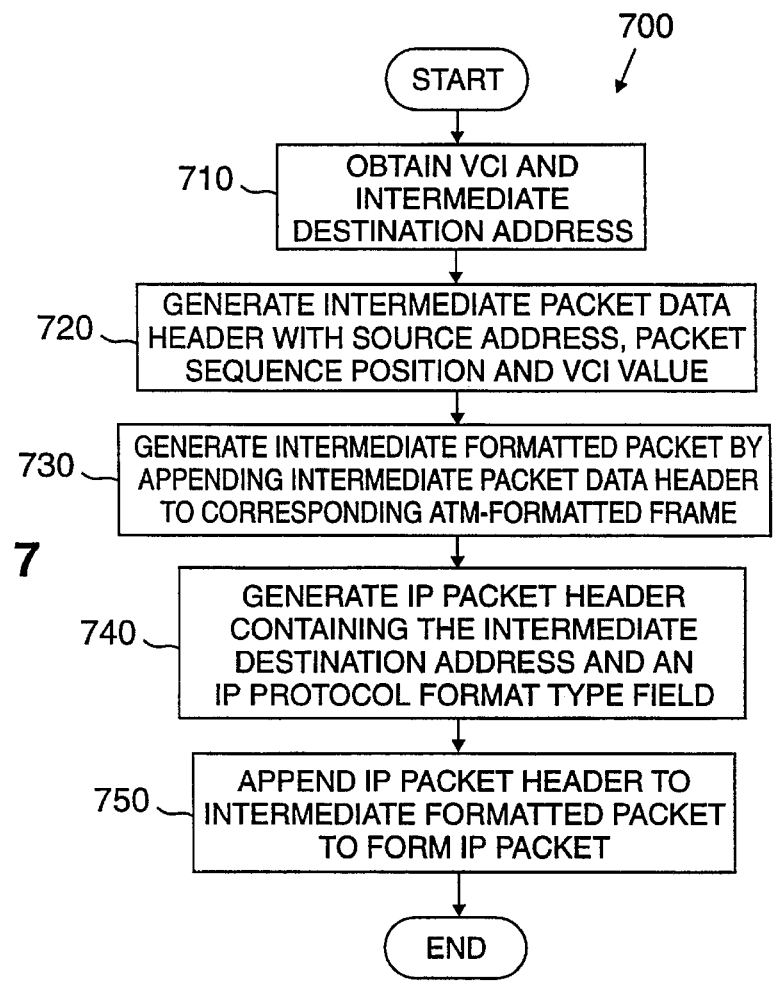
FIG. 7 illustrates a flow diagram of an encapsulator routine which may be used by encapsulator-decapsulators shown in FIG. 4.
Figure 8:
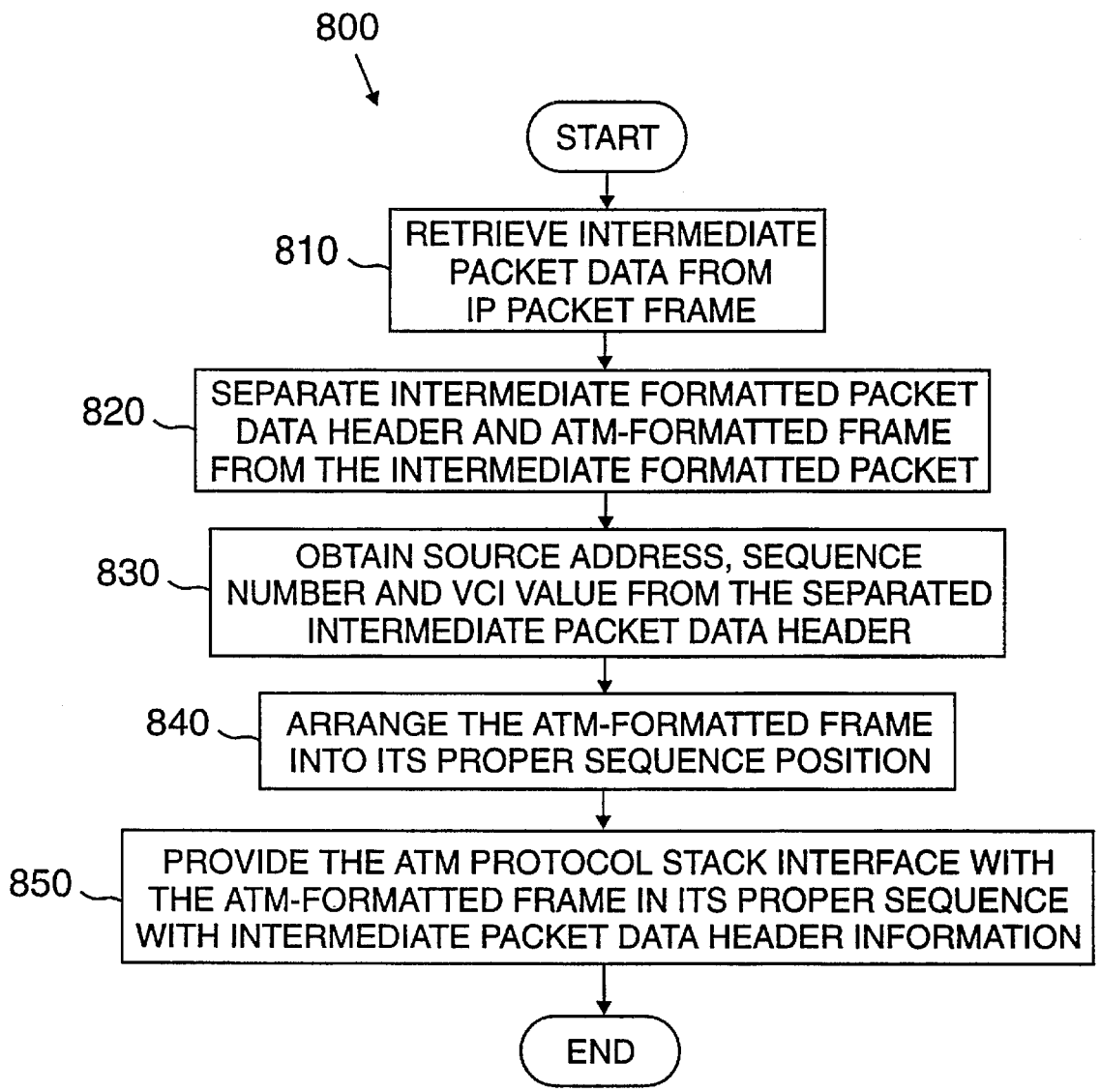
FIG. 8 illustrates a flow diagram of a decapsulator routine which may be used by the encapsulator-decapsulators shown in FIG. 4.

The encapsulator-decapsulators 425 and 460 of FIG. 4, which encapsulate ATM-formatted frames within IP formatted frames, overcome the obstacle of data format mismatch in transmitting ATM-formatted frames on the Internet 310. FIG. 7 illustrates a flow diagram of an encapsulation routine 700 which may be performed in the encapsulator-decapsulators to encapsulate ATM formatted frames in IP packets for transmission over the Internet 310. In addition, FIG. 8 illustrates a flow diagram of a decapsulation routine 800 which may also be performed in the encapsulator-decapsulators 425 and 460 to decapsulate received IP encapsulated packets back into ATM-formatted frames.

The following discussion of the routines 700 and 800 will be made with regard to the example described above concerning data transmission between the application program B 430 and a remote routine implemented on the processing system 320. The application program B 430 transmits ATM-formatted frames by first passing it to the ATM protocol stack interface 455 which generates corresponding ATM-formatted data packets, such as AAL frames. One suitable AAL frame format for encapsulation within IP packets is an AAL5 format. A detailed description of AAL frames and IP packets appears in the previously noted ATM forum UNI reference and BSD reference, respectively. The ATM-formatted frames are then passed to the encapsulator-decapsulator 460 which performs the encapsulation routine 700 of FIG. 7 on each of the frames.

Referring to FIG. 7, in step 710, the encapsulator-decapsulator 460 obtains the VCI value and an intermediate destination address for an ATM-formatted frame that is to be encapsulated and transmitted. The intermediate destination address corresponds to the Internet network address of the closest ATM-enabled host or gateway that possesses links to both the Internet 310 and the ATM network 300, such as the processing system 100 in FIG. 4.

The routine 700 then constructs an intermediate data packet header in step 720. The intermediate data packet header may contain information such as an ATM address of the source device sending the data, the corresponding VCI value of the connection and a packet sequence position number. The packet sequence position number is a value that corresponds to the sequence position of the frame when the transmitted information consists of several frames. Since the Internet 310 is a connectionless network where the network may route each IP packet to the destination device by different paths based on the destination address in a header of each packet, the packets may be received out of sequence. The packet sequence position number in the intermediate data packet header permits the gateway processing system to detect if transmitted encapsulated IP packets are received out of sequence, and if so, the proper sequence of the received packets.

An intermediate formatted packet is then generated, in step 730, by appending the intermediate data packet header constructed in step 720 to the ATM-formatted frame to be transmitted. Then, in step 740, the routine 700 generates an IP packet header. The IP packet header is a 20 byte header that contains the necessary information and format for transmission of a corresponding IP packet on the Internet 310. Such a header contains the Internet network address of the closest gateway processing system and a data field specifying the IP format type of the packet. The value contained in the IP format type field should indicate that the data packet is an encapsulated ATM-formatted frame.

Then, in step 750, the generated IP packet header is then appended to the generated intermediate data packet to form the IP packet. An IP packet consists of the 20 byte IP packet header and a variable length data portion or payload. The payload of the IP packet generated by the routine 700 contains the intermediate packet header and the ATM-formatted frame. The generated IP packet possesses the proper packet format for transmission over the Internet 310.

The generated IP packet is then transmitted on the Internet 310 and received by the processing system 100. The corresponding IP stack interface 415 reads the IP packet header to obtain the IP format packet type information. If the IP format packet type indicates that the packet contains an encapsulated ATM-formatted frame, as in this example, then the IP packet is sent to the encapsulator-decapsulator 425 for decapsulation. A decapsulation routine 800 which may be used in the encapsulator-decapsulator 425 to strip out the ATM-formatted frame is shown in FIG. 8.

Referring to FIG. 8, in step 810, the IP packet header is removed from the received IP packet to obtain the intermediate packet. The intermediate packet is then separated into the intermediate data packet header and ATM-formatted frame in step 820. The source address, the packet sequence position number and the VCI value are then from the separated intermediate packet header in step 830.

Then, in step 840, the ATM-formatted frame is arranged into its proper sequence position among other previously received ATM-formatted frames based on the packet sequence position number. One suitable technique for arranging the ATM-formatted frames in the proper sequence is to store the received frames into a memory buffer connected to the encapsulator-decapsulator 425. The stored frames may then be outputted in their proper sequence to the ATM protocol stack interface 420 based on the packet sequence position number as is indicated in step 850. In addition, the corresponding intermediate data packet header information may be transmitted with each frame to the ATM protocol stack interface 420.

In this example, the ATM protocol stack interface 420 would cause the ATM network interface 109 to generate a required trailer, such as an AAL5 trailer if the ATM-formatted frame was an AAL5 frame, and transmit the frame with appended trailer over the ATM network 300 to the destination processing system 320. The ATM protocol stack interface 420 would transmit the frame to a particular destination based on information from the connection manager 410. The connection manager 410 determines the cell's proper destination based on its VCI value. In an alternative embodiment, the trailer may be generated by the ATM protocol stack interface 455 in the above example, before a corresponding frame is encapsulated by the encapsulator-decapsulator 460.

The encapsulator-decapsulators 425 and 460 would operate in a substantially identical manner when data is transmitted in the reverse direction. For instance, in transmitting ATM-formatted frames from the processing system 320 to the application program B 430 in FIG. 4, the processing system 320 would transmit the ATM-formatted frames over the ATM network 300 to the ATM network interface 109 and ATM protocol stack interface 420 of the processing system 100 based on information from the connection manager 410. Also, based on information from the connection manager 410, the ATM protocol stack interface 420 would pass the ATM-formatted frame to the encapsulator-decapsulator 425 for encapsulation. The corresponding generated IP packet would then be transmitted over the Internet 310 to the processing system 330.

Within the processing system 330, the received IP packet would be passed to the encapsulator-decapsulator 460 by the IP stack interface 440. The encapsulator-decapsulator 460 would then decapsulate the packet and transmit the decapsulated ATM-formatted frame to the ATM protocol stack interface 455 which would provide the frame to the application program B 430.

In an alternative embodiment, the encapsulation routine 700 may be implemented in the ATM protocol stack interface with the decapsulation routine 800 implemented in the corresponding IP stack interface, wherein the stack interfaces communicate directly with one another in a processing system. Such an embodiment eliminates the need for a separate encapsulator-decapsulator routine or circuit in each processing system.

Thus, the present invention extends the services available to devices connected to the Internet and ATM networks by employing a gateway processing system, such as the system 100 of FIGS. 3 and 4, and the methods and systems for establishing connections and internetwork data transfer between remote routines in the manner described above.

Although several embodiments for providing interprocess communication and internetwork data transfer have been described above, it would be readily understood by those having ordinary skill in the art that many modifications are possible in the described embodiments without departing from the teachings of the present invention. All such modifications are intended to be encompassed by the claimed invention. For instance, multiple gateway processing systems may be used between connectionless- and connection-oriented networks wherein each such system may possess a connection manager, such as the connection manager program 410, to control connections of the closest devices on the connectionless network.

Further, each of the routines described above, including the connection manager, the connection service routines library and the encapsulator-decapsulator may be implemented as software routines operating on the respective processing system or as a combination of software routines and dedicated circuits to provide their specified function.

We claim:

1. A method for transferring data between a source routine operating in a source device on a first network and a destination routine operating in a destination device, the source and destination routines generating and receiving asynchronous transfer mode ("ATM") formatted frames and the first network transmitting Internet Protocol ("IP") packets, the method comprising the steps of:
   a) generating an intermediate data format header containing source, destination and ATM routing information;
   b) appending the generated intermediate data format header to an ATM-formatted frame to form an intermediate format data packet, the ATM-formatted frame being generated by the source routine;
   c) encapsulating the intermediate format data packet in a data portion of an IP packet;
   d) transmitting the IP packet on the first network;
   e) decapsulating the IP packet to retrieve the intermediate format data packet;
   f) retrieving the ATM-formatted frame and intermediate data format header from the decapsulated intermediate format data packet;
   g) forming an ATM cell based on the retrieved ATM-formatted frame and the ATM routing information in the retrieved intermediate data format header; and
   h) routing the formed ATM cell.

2. The method of claim 1, wherein the intermediate data format header generated in step a) contains a packet sequence position number indicating the position the ATM-formatted frame with respect to other ATM-formatted frames transmitted in a corresponding sequence.

3. The method of claim 1, wherein the destination device is a gateway processing system linking a second network to the first network, the second network being operable to transmit ATM cells, and wherein steps e), f)$_s$ g) and h) are performed by the gateway processing system.

4. The method of claim 1, wherein the generated intermediate format data header includes a source device network address for said source information, an ATM virtual circuit identifier value for said routing information, and a packet sequence position number indicating a position of the ATM-formatted frame with respect to other data packets transmitted in a sequence.

5. The method of claim 1, further comprising the step of generating an Internet protocol packet header containing a network address of a destination Internet device and an Internet protocol type field indicating that the packet is an encapsulated ATM frame before the encapsulation step c); and wherein step c) further comprises appending the generated Internet protocol packet header to the intermediate format data packet.

6. The method of claim 1, wherein the ATM-formatted frame is an AAL frame.

7. The method of claim 6, wherein the AAL frame is an AAL5 frame.

8. A method for encapsulating an ATM-formatted frame in an IP packet for transmission over a first network capable of transmitting IP packets, the method comprising the steps of:
   a) generating an intermediate data format header containing source and destination information;
   b) appending the generated intermediate format data packet to the ATM-formatted frame to form an intermediate format data packet;
   c) generating an IP packet header; and
   d) appending the IP packet header to the intermediate format data packet to form the IP packet.

9. The method of claim 8, wherein the intermediate format data header information generated in step a) contains a source device network address, a virtual circuit identifier value for an established virtual circuit between the source and destination devices, and a packet sequence position number indicating a position of the ATM-formatted frame with respect to other data packets transmitted in a sequence.

10. The method of claim 8, further comprising the step of generating an Internet protocol packet header containing a network address of a destination Internet device and an Internet protocol type field indicating that the packet is an encapsulated ATM frame before the encapsulation step c); and wherein step c) further comprises appending the generated Internet protocol packet header to the intermediate format data packet.

11. The method of claim 8, wherein the ATM-formatted frame is an AAL frame.

12. The method of claim 11, wherein the AAL frame is an AAL5 frame.

13. A processing system for transmitting ATM-formatted frames over a first network operable to transmit IP packets, the processing system comprising:
   a source device linked to the first network, the source device having at least one memory storage device operable to store a plurality of processing system instructions, and at least one processing unit for controlling the transmission data and executing at least one of said processing unit instructions from said memory storage device, said processing unit operable to generate an intermediate format data header containing source, destination and ATM routing information, append the generated intermediate data format header to an ATM-formatted frame to form an intermediate format data packet, and encapsulate the intermediate format data packet to form a data portion of an IP packet for transmission on the first network; and
   a first network destination device linked to the first network, the destination device having at least one memory storage device operable to store a plurality of processing system instructions, and at least one processing unit for controlling the reception of data and executing at least one of said processing unit instructions from said memory storage device, said processing unit operable to decapsulate the IP packet to retrieve the intermediate format data packet, obtain the ATM-formatted frame and intermediate data format header from the decapsulated intermediate format data packet, forming an ATM cell based on the retrieved ATM-formatted frame and the ATM routing information in the retrieved intermediate data format header, and routing the formed ATM cell.

14. The processing system of claim 13, further comprising:
   a second network connected to the first network destination device, the second network being operable to transmit ATM cells; and
   a second network destination device, wherein the first network destination device is a gateway device which is operable to route the ATM cell formed from the ATM-formatted frame encapsulated in the IP packet to the second network destination device based on the routing information in the retrieved intermediate data format header.

15. The processing system of claim 13, wherein the intermediate format data header information header includes a source device network address for said source information, an ATM virtual circuit identifier value for said routing information, and a packet sequence position number indicating a position of the ATM-formatted frame with respect to other ATM-formatted frames transmitted in a sequence.

16. The processing system of claim 13, wherein the source is further operable to:
   generate an Internet protocol packet header containing an Internet address of the first network destination device and an Internet protocol type field indicating that the packet is an encapsulated ATM formatted frame; and
   append the generated Internet protocol packet header to the intermediate format packet to generate the IP packet.

17. The processing system of claim 13, wherein the ATM-formatted frame is an AAL frame.

18. The processing system of claim 17, wherein the AAL frame is an AAL5 frame.

19. A processing system for transmitting ATM-formatted frames over a first network operable to transmit IP packets, the processing system comprising:
   a source device connected to the first network, the source device having an IP stack interface and an ATM protocol stack interface communicating with an encapsulator, the IP stack interface being connected to an IP interface connected to the first network; and
   a first network destination device connected to the first network, the first network destination device having an IP, and ATM protocol stack interfaces communicating with a decapsulator, the IP stack interface being connected to an IP network interface connected to the first network.

20. the processing system of claim 19, wherein the first network destination device further comprises:
   an ATM network interface connected to the ATM protocol stack interface;
   a second network connected to the ATM network interface, the second network being operable to transmit ATM formatted frames; and
   a second network destination device connected to the second network, wherein the ATM protocol stack interface of the first network destination device is operable to a route decapsulated ATM-formatted frame over the second network to the second network destination device, if the destination of the ATM-formatted frame transmitted by the source device is the second network destination device.

21. the processing system of claim 19, wherein the encapsulator is part of the IP stack interface of the source device.

22. the processing system of claim 19, wherein the decapsulator is part of the ATM protocol stack interface of the first network destination device.

* * * * *